United States Patent
Ueda (10) Patent No.: US 8,132,421 B2
(45) Date of Patent: Mar. 13, 2012

(54) TURBO CHILLER, HEAT SOURCE SYSTEM, AND METHODS FOR CONTROLLING THEM

(75) Inventor: Kenji Ueda, Kiyosu (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 552 days.

(21) Appl. No.: 12/441,363

(22) PCT Filed: Nov. 25, 2008

(86) PCT No.: PCT/JP2008/071314
§ 371 (c)(1),
(2), (4) Date: Mar. 13, 2009

(87) PCT Pub. No.: WO2009/107295
PCT Pub. Date: Sep. 3, 2009

(65) Prior Publication Data
US 2010/0170274 A1 Jul. 8, 2010

(30) Foreign Application Priority Data

Feb. 28, 2008 (JP) ................................. 2008-048797

(51) Int. Cl.
*F25B 41/00* (2006.01)
*F25B 1/00* (2006.01)
*G06F 11/30* (2006.01)

(52) U.S. Cl. .......... 62/209; 62/208; 62/228.1; 62/228.3; 702/182

(58) Field of Classification Search .................... 62/208, 62/209, 228.1, 228.3, 238.6, 498; 700/275; 702/182
See application file for complete search history.

(56) References Cited

U.S. PATENT DOCUMENTS
7,412,841 B2 8/2008 Ueda et al.

FOREIGN PATENT DOCUMENTS

| JP | 1-200094 A | 8/1989 |
|----|------------|--------|
| JP | 5-93550 A | 4/1993 |
| JP | 10-9695 A | 1/1998 |
| JP | 2005-114295 A | 4/2005 |
| JP | 2005-180267 A | 7/2005 |

*Primary Examiner* — Chen Wen Jiang
(74) *Attorney, Agent, or Firm* — Birch, Stewart, Kolasch & Birch, LLP (57) ABSTRACT

There is provided a turbo chiller that can be operated at high efficiency within an adequate chilling capacity range even when the cooling water temperature changes during the operation. The adequate chilling capacity range is obtained by using a flow coefficient and a pressure coefficient at a specific operating point of a turbo compressor as well as a predetermined coefficient to determine an arithmetic expression representing the relationship between a head and a chilling capacity, using a chilling capacity that can lead to a substantially highest coefficient of performance at a single head to obtain the predetermined coefficient as an optimum coefficient, computing an adequate operation coefficient range having a predetermined range and including the optimum coefficient, and substituting the adequate operation coefficient range and a head at the time of operation into the arithmetic expression.

4 Claims, 6 Drawing Sheets

TURBO CHILLER, HEAT SOURCE SYSTEM, AND METHODS FOR CONTROLLING THEM

TECHNICAL FIELD

The present invention relates to a turbo chiller, a heat source system, and methods for controlling them.

BACKGROUND ART

There is a heat source system using a plurality of turbo chillers. The heat source system controls the number of turbo chillers to be activated in accordance with the amount of heat required for an external load. In the number control, it is required to save energy by operating the activated turbo chillers at high efficiency.

Patent Citation 1 discloses a technology for obtaining the relationship between the coefficient of performance and the load factor of an inverter-driven turbo chiller, the coefficient of performance determined by the temperature of cooling water supplied to a condenser, and controlling the inverter in such a way that the coefficient of performance is greater than or equal to a predetermined value.

Patent Citation 1: Japanese Unexamined Patent Application, Publication No. 2005-114295

DISCLOSURE OF INVENTION

In the known art described in Patent Citation 1, however, it is necessary to obtain the relationship between the coefficient of performance and the load factor in advance in accordance with the temperature of the cooling water. At a cooling water temperature at which the relationship has not been obtained, the turbo chiller cannot be operated at high efficiency because no adequate operating point is known. To avoid such a situation, it is necessary to obtain the relationship between the coefficient of performance and the load factor at every conceivable cooling water temperature. In this case, the amount of data is enormous and unrealistic.

The invention has been made in view of such circumstances. An object of the invention is to provide a turbo chiller that can be operated at high efficiency within an adequate chilling capacity range even when the cooling water temperature (head) changes during the operation. Other objects of the invention are to provide a heat source system and methods for controlling the turbo chiller and the heat source system.

To achieve the above objects, a turbo chiller, a heat source system, and methods for controlling the same employ the following solutions:

That is, a turbo chiller according to the invention is operated within a predetermined adequate chilling capacity range, the turbo chiller including a turbo compressor driven by an inverter in a manner that enables variable revolution speeds, a condenser that condenses refrigerant compressed by the turbo compressor, an expansion valve that expands the condensed refrigerant, and an evaporator that evaporates the expanded refrigerant to cool cooled water. The turbo chiller is characterized in that the adequate chilling capacity range is obtained by using a flow coefficient and a pressure coefficient at a specific operating point of the turbo compressor as well as a predetermined coefficient to determine an arithmetic expression representing the relationship between a head and a chilling capacity, using a chilling capacity that can lead to a substantially highest coefficient of performance at a single head to obtain the predetermined coefficient as an optimum coefficient, computing an adequate operation coefficient range having a predetermined range and including the optimum coefficient, and substituting the adequate operation coefficient range and a head at the time of operation into the arithmetic expression.

The present inventors have extensively conducted studies and found that the coefficient of performance of a turbo chiller including a turbo compressor driven by an inverter in a manner that enables variable revolution speeds strongly reflects apparatus characteristics of the turbo compressor, which is a centrifugal compressor.

The present inventors have also found that a flow coefficient and a pressure coefficient at a specific operating point of the turbo compressor as well as a predetermined coefficient can be used to determine an arithmetic expression representing the relationship between a head and a chilling capacity, and decided to use the arithmetic expression to control the operation of the turbo chiller. The coefficient used in the arithmetic expression is determined by using a chilling capacity that can lead to a substantially highest coefficient of performance at a single head (a single cooled water temperature and a single cooling water temperature, for example). The thus determined coefficient is used as an optimum coefficient, and an adequate operation coefficient range having a predetermined range and including the optimum coefficient is set. Using the adequate operation coefficient range and substituting a predetermine head into the arithmetic expression allow an adequate chilling capacity range to be obtained (because the flow coefficient and the pressure coefficient are fixed values provided at the specific operating point). Since the thus obtained adequate chilling capacity range can be obtained from the arithmetic expression by substituting a head at the time of operation and using the adequate operation coefficient range, any situation can be flexibly handled even when the operation conditions (head) are changed. Therefore, since the turbo chiller can be operated within an adequate chilling capacity range for arbitrary operation conditions, the turbo chiller can be operated within a range where a good coefficient of performance is obtained.

The chilling capacity used in the arithmetic expression may be any parameter that reflects the chilling capacity and can be, for example, an air flow sucked into the turbo compressor. Since the head used in the arithmetic expression varies with the physical properties of the refrigerant used, the head can be obtained by using the physical properties to determine in advance a property expression including variables, such as the difference in temperature between the cooled water and the cooling water and the difference in pressure between the evaporator and the condenser, and then substituting the difference between the condenser outlet temperature of the cooling water that cools the condenser and the evaporator outlet temperature of the cooled water that is cooled by the evaporator or the difference between the condenser pressure and the evaporator pressure into the property expression.

A heat source system according to the invention may include a plurality of turbo chillers described above, and the number of the turbo chillers to be activated may be controlled in such a way that the sum of chilling capacities outputted from the turbo chillers operated within the adequate chilling capacity range satisfies the chilling capacity required for an external load.

The above configuration allows the number of turbo chillers to be activated to be determined in such a way that the chilling capacity required for an external load is satisfied. Since the number control is carried out in such a way that each of the activated turbo chillers is operated within an adequate chilling capacity range, a plurality of turbo chillers can be operated at high coefficients of performance to provide a high energy saving effect.

A method for controlling a turbo chiller according to the invention is used for a turbo chiller operated within a predetermined adequate chilling capacity range, the turbo chiller including a turbo compressor driven by an inverter in a manner that enables variable revolution speeds, a condenser that condenses refrigerant compressed by the turbo compressor, an expansion valve that expands the condensed refrigerant, and an evaporator that evaporates the expanded refrigerant to cool cooled water. The method includes using a flow coefficient and a pressure coefficient at a specific operating point of the turbo compressor as well as a predetermined coefficient to determine an arithmetic expression representing the relationship between a head and a chilling capacity, using a chilling capacity that can lead to a substantially highest coefficient of performance at a single head to obtain the predetermined coefficient as an optimum coefficient, computing an adequate operation coefficient range having a predetermined range and including the optimum coefficient, and substituting the adequate operation coefficient range and a head at the time of operation into the arithmetic expression to obtain the adequate chilling capacity range.

The present inventors have extensively conducted studies and found that the coefficient of performance of a turbo chiller including a turbo compressor driven by an inverter in a manner that enables variable revolution speeds strongly reflects apparatus characteristics of the turbo compressor, which is a centrifugal compressor.

The present inventors have also found that a flow coefficient and a pressure coefficient at a specific operating point of the turbo compressor as well as a predetermined coefficient can be used to determine an arithmetic expression representing the relationship between a head and a chilling capacity, and decided to use the arithmetic expression to control the operation of the turbo chiller. The coefficient used in the arithmetic expression is determined by using a chilling capacity that can lead to a substantially highest coefficient of performance at a single head (a single cooled water temperature and a single cooling water temperature, for example). The thus determined coefficient is used as an optimum coefficient, and an adequate operation coefficient range having a predetermined range and including the optimum coefficient is set. Using the adequate operation coefficient range and substituting a predetermine head into the arithmetic expression allow an adequate chilling capacity range to be obtained (because the flow coefficient and the pressure coefficient are fixed values provided at the specific operating point). Since the thus obtained adequate chilling capacity range can be obtained from the arithmetic expression by substituting a head at the time of operation and using the adequate operation coefficient range, any situation can be flexibly handled even when the operation conditions (head) are changed. Therefore, since the turbo chiller can be operated within an adequate chilling capacity range for arbitrary operation conditions, the turbo chiller can be operated within a range where a good coefficient of performance is obtained.

The chilling capacity used in the arithmetic expression may be any parameter that reflects the chilling capacity and can be, for example, an air flow sucked into the turbo compressor. Since the head used in the arithmetic expression varies with the physical properties of the refrigerant used, the head can be obtained by using the physical properties to determine in advance a property expression including variables, such as the difference in temperature between the cooled water and the cooling water and the difference in pressure between the evaporator and the condenser, and then substituting the difference between the condenser outlet temperature of the cooling water that cools the condenser and the evaporator outlet temperature of the cooled water that is cooled by the evaporator or the difference between the condenser pressure and the evaporator pressure into the property expression.

A method for controlling a heat source system according to the invention may be configured in such a way that the heat source system includes a plurality of turbo chillers described above, and the method includes controlling the number of the turbo chillers to be activated in such a way that the sum of chilling capacities outputted from the turbo chillers operated within the adequate chilling capacity range satisfies the chilling capacity required for an external load.

The above configuration allows the number of turbo chillers to be activated to be determined in such a way that the chilling capacity required for an external load is satisfied. Since the number control is carried out in such a way that each of the activated turbo chillers is operated within an adequate chilling capacity range, a plurality of turbo chillers can be operated at high coefficients of performance to provide a high energy saving effect.

According to the invention, substituting a head at the time of operation into an arithmetic expression allows an adequate chilling capacity range that leads to a high coefficient of performance, whereby an energy-saving operation can be achieved.

EXPLANATION OF REFERENCE

1: Heat source system
3: External load
11, 12, 13: Turbo chiller
21, 22, 23: Cooled water pump
Had: Head
Qst: Air flow
kopt: Optimum coefficient

BEST MODE FOR CARRYING OUT THE INVENTION

An embodiment according to the invention will be described below with reference to the drawings.

Figure 1:
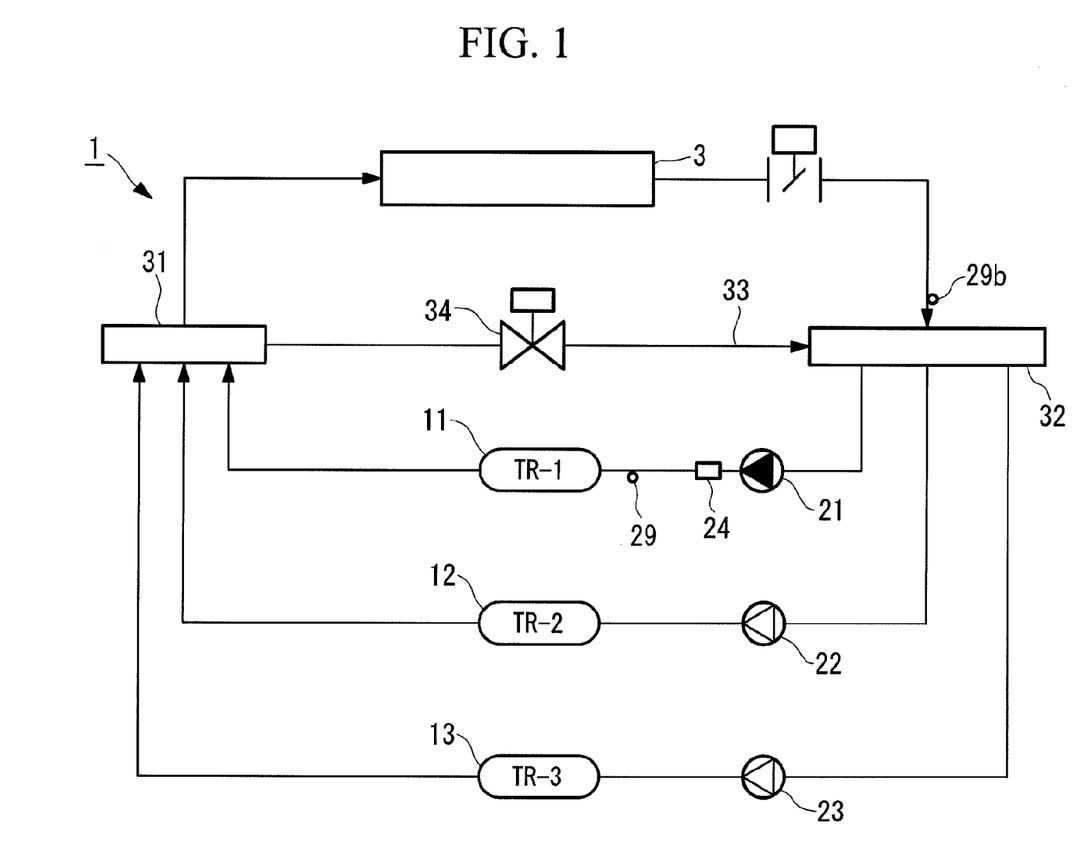
FIG. 1 is a schematic configuration diagram showing a heat source system according to an embodiment of the invention.

FIG. 1 shows an overall configuration of a heat source system according to an embodiment.

The heat source system 1 is installed in buildings and factory facilities. The heat source system 1 includes three turbo chillers, first to third turbo chillers 11, 12, and 13, each of which providing low-temperature heat to cooled water to be supplied to an external load 3, such as an air conditioner and a fan coil. The first to third turbo chillers 11, 12, and 13 are disposed in parallel to the external load 3.

First to third cooled water pumps 21, 22, and 23 that pump cooled water are provided upstream of the turbo chillers 11, 12, and 13, respectively, when viewed in the direction in which the cooled water flows. The cooled water pumps 21, 22, and 23 deliver cooled water from a return header 32 to the turbo chillers 11, 12, and 13. Each of the cooled water pumps 21, 22, and 23 is driven by an inverter motor, and the flow of the cooled water is variably controlled by changing the revolution speed of the inverter motor.

A supply header 31 collects the cooled water obtained in the turbo chillers 11, 12, and 13.

The cooled water collected by the supply header 31 is supplied to the external load 3.

The cooled water used in the external load 3 for air conditioning or other purposes and hence heated therein is delivered to the return header 32. The cooled water is branched in the return header 32 and delivered to the turbo chillers 11, 12, and 13.

A first cooled water flow meter 24 that measures the amount of cooled water that flows out of the first cooled water pump 21 is provided downstream thereof. The output of the first cooled water flow meter 24 is sent to a controller of the heat source system 1.

A first cooled water inlet temperature sensor 29 that measures the temperature of the cooled water that flows into the first turbo chiller 11 is provided in a cooled water pipe located upstream of the first turbo chiller 11. The output of the first cooled water inlet temperature sensor 29 is sent to the controller. When a bypass valve 34 attached to a bypass pipe 33 is fully closed, a temperature sensor 29b provided in a cooled water pipe located upstream of the return header 32 may be used instead of the first cooled water inlet temperature sensor.

Another cooled water flow meter and cooled water inlet temperature sensor are provided for each of the second and third turbo chillers 12, 13, as in the first turbo chiller 11. FIG. 1, however, shows the configuration of the cooled water flow meter and cooled water inlet temperature sensor only for the first turbo chiller 11 for clarity.

Figure 2:
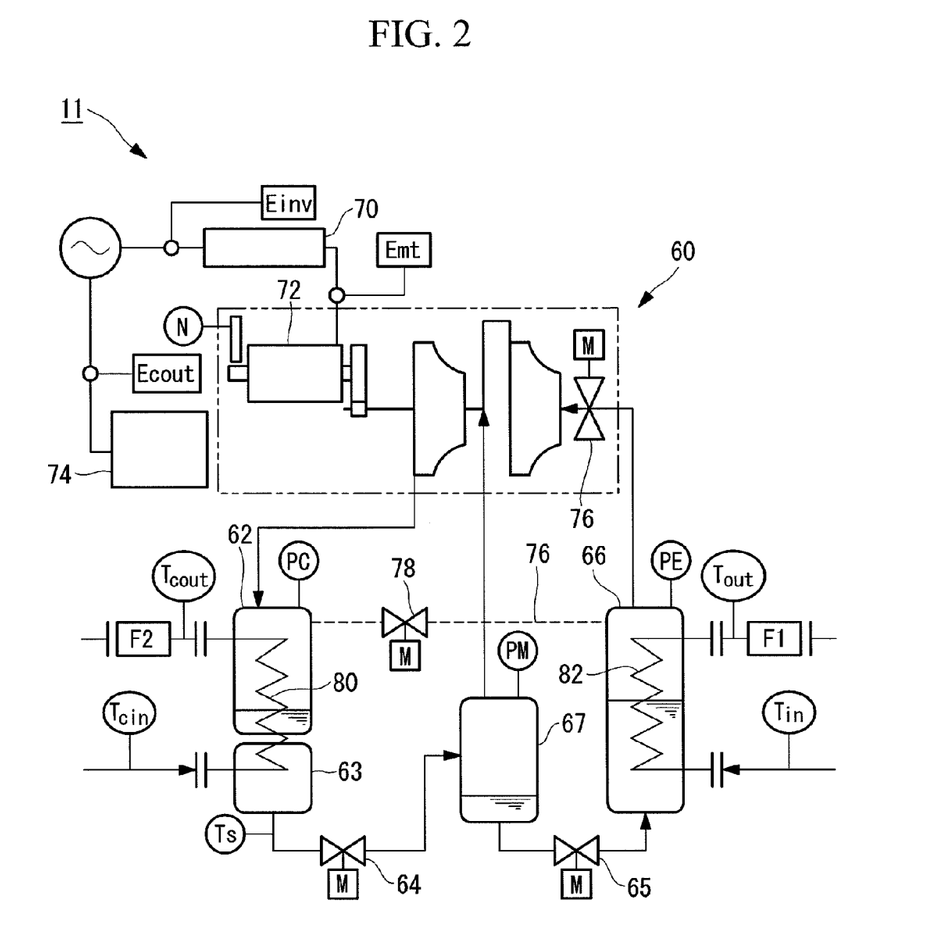
FIG. 2 shows a turbo chiller used in the heat source system shown in FIG. 1.

FIG. 2 shows the turbo chillers 11, 12, and 13 in detail. In FIG. 2, only one of the three turbo chillers disposed in parallel, the first turbo chiller 11, is shown for clarity.

The turbo chiller 11 is configured to achieve a two-stage compression and two-stage expansion sub-cooling cycle. The turbo chiller 11 includes a turbo compressor 60 that compresses refrigerant, a condenser 62 that condenses high-temperature, high-pressure gas refrigerant compressed by the turbo compressor 60, a sub-cooler 63 that overcools the liquid refrigerant condensed by the condenser 62, a high-pressure expansion valve 64 that expands the liquid refrigerant from the sub-cooler 63, an intermediate cooling device 67 that is connected to the high-pressure expansion valve 64 as well as to an intermediate stage of the turbo compressor 60 and a low-pressure expansion valve 65, and evaporator 66 that evaporates the liquid refrigerant expanded by the low-pressure expansion valve 65.

The turbo compressor 60 is a centrifugal two-stage compressor and driven by an electric motor 72, the revolution speed of which being controlled by an inverter 70. The output of the inverter 70 is controlled through a control panel 74. An inlet guide vane (hereinafter referred to as "IGV") 76 that controls the flow of intake refrigerant is provided at a refrigerant intake port of the turbo compressor 60, and the IGV 76 can control the capacity of the turbo chiller 11.

A condensed refrigerant pressure sensor Pc that measured the condensed refrigerant pressure is provided in the condenser 62. The output of the sensor Pc is sent to the controller.

The sub-cooler 63 is provided on the downstream side of the refrigerant flow from the condenser 62 and overcools the condensed refrigerant. A temperature sensor Ts that measures the temperature of the overcooled refrigerant is provided on the immediate downstream side of the refrigerant flow from the sub-cooler 63.

A cooling heat-transfer tube 80 for cooling the condenser 62 and the sub-cooler 63 is inserted therein. The flow of cooling water is measured with a flow meter F2. The outlet temperature of the cooling water is measured with a temperature sensor Tcout, and the inlet temperature of the cooling water is measured with a temperature sensor Tcin. The cooling water passes through a cooling tower (not shown) where the heat of the cooling water is exhausted to the outside, and is then reintroduced into the condenser 62 and the sub-cooler 63.

A pressure sensor PM that measures the intermediate pressure is provided in the intermediate cooling device 67.

A pressure sensor PE that measures the evaporation pressure is provided in the evaporator 66. The evaporator 66 absorbs heat and provides cooled water at a rated temperature (7° C., for example). A cooled water heat-transfer tube 82 is inserted into the evaporator and cools the cooled water to be supplied to the external load. The flow of the cooled water is measured with a flow meter F1. The outlet temperature of the cooled water is measured with a temperature sensor Tout, and the inlet temperature of the cooled water is measured with a temperature sensor Tin.

A hot-gas bypass tube 76 is provided between a gas-phase portion of the condenser 62 and a gas-phase portion of the evaporator 66. A hog-gas bypass valve 78 is provided to control the flow of the refrigerant flowing through the hot-gas bypass tube 76. The hog-gas bypass valve 78 can adjust the amount of the hot-gas bypassed flow to control a very small volume that cannot be precisely controlled by the IGV 76.

The operation of the thus configured heat source system 1 will be described below.

Figure 3:
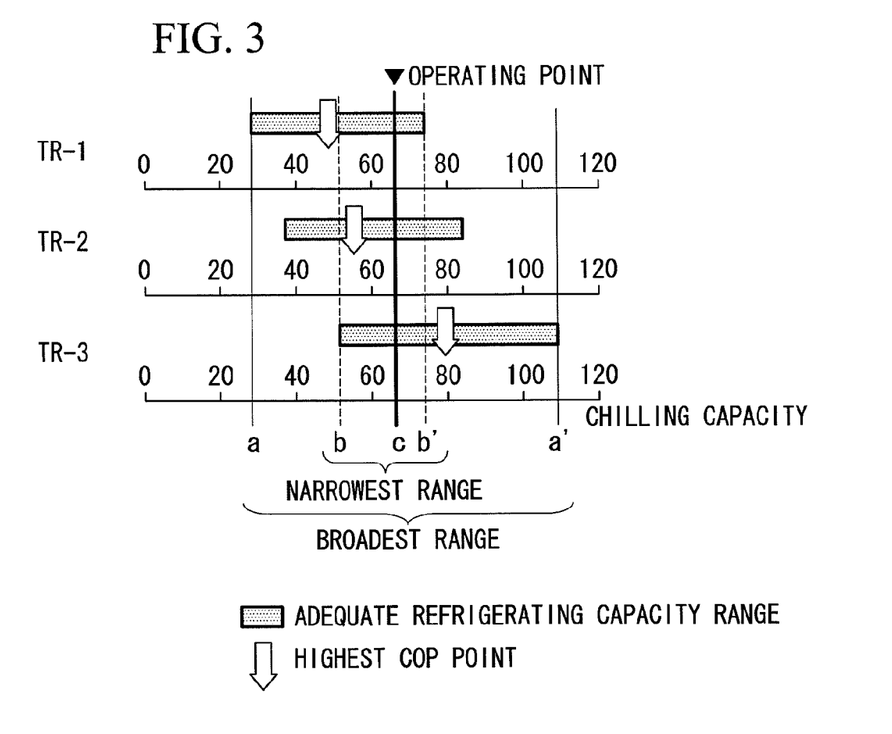
FIG. 3 schematically shows a number-controlled operation of the heat source system.

FIG. 3 shows the concept of how to control the number of turbo chillers in the heat source system 1. FIG. 3 shows an adequate chilling capacity range at a predetermined head. That is, a different head (a different cooling water temperature, because the outlet temperature of the cooled water is typically fixed) leads to a map illustrating a different adequate chilling capacity range.

The heat source system 1 controls the number of activated turbo chillers appropriate for the chilling capacity required for the external load 3. In the present embodiment, as shown in FIG. 3, the number is controlled in such a way that each of the turbo chillers 11, 12, and 13 is operated in an adequate chilling capacity range. For each of the turbo chillers 11 (TR-1), 12 (TR-2), and 13 (TR-3), a chilling capacity range adequate for a head at the time of operation is computed based on an arithmetic expression, which will be described later. It is preferable to operate each of the turbo chillers at a chilling capacity that presents the highest COP (the coefficient of performance is hereinafter referred to as "COP") at which the turbo chiller is most efficiently operated. However, different turbo chillers have different highest-COP load points, where the highest efficiency is provided, (the positions indicated by the arrows in FIG. 3). On the other hand, in a typical specification where the flow of the cooled water is fixed, the load factors (operating points) of the turbo chillers are the same. Therefore, since the adequate chilling capacity ranges of the turbo chillers differ from one another, as shown in FIG. 3, the adequate range when all the three turbo chillers are operated is set to the broadest range a-a' between the maximum and minimum values of all the adequate capacity ranges, or the narrowest range b-b' where all the adequate chilling capacity ranges overlap. The turbo chillers are preferably controlled in such a way that they can be operated at least within the broadest range a-a'.

In an incremental stepping operation in which the chilling capacity required for the external load increases, a single turbo chiller is first operated and it is judged whether the turbo chiller is operated within an adequate chilling capacity range. When the required chilling capacity increases and becomes greater than the upper limit of the adequate chilling capacity range of the activated turbo chiller, a second turbo chiller is activated. It is noted, however, that the adequate chilling capacity range may be greater than 100% in some cases, as shown in FIG. 3. In this case, it is preferable to set a standard upper limit (80%, for example). As described above, each of the turbo chillers is controlled in such a way that the turbo chiller outputs an adequate chilling capacity and is operated at a chilling capacity that presents a highest possible COP.

In a decremental stepping operation in which the required chilling capacity decreases, the number control is carried out in the same manner. That is, when the chilling capacity required for the external load decreases and becomes lower than the lower limit of the range a-a' of the overall chilling capacity of the three activated turbo chillers, one of the three turbo chillers is stopped. It is noted, however, that the adequate chilling capacity range may be smaller than the minimum load of a turbo chiller, which is 20%, for example. In this case, it is preferable to set a standard lower limit (30%, for example).

The map shown in FIG. 3 can be quickly obtained for an arbitrary head by using an arithmetic expression, which will be described later, even when the head (temperature of the cooling water, for example) changes, whereby any situation can be flexibly handled.

The arithmetic expression by which an adequate chilling capacity range is determined for each head will now be described.

A turbo compressor, which is a centrifugal compressor, has a unique design point where the inner gas flow is optimum. The design point can be expressed by two dimensionless parameters, a flow coefficient φ and a pressure coefficient μad shown in the following expressions (1) and (2):

[Expression 1]

Flow coefficient Φ[-]

$$\phi = \frac{Q_{st}}{\frac{\pi}{4}D^2 u} \quad (1)$$

Pressure coefficient μad [-]

$$\mu_{ad} = \frac{gH_{ad}}{u^2} \quad (2)$$

Impeller circumferential speed: u [m/s]

$$u = \pi DN \quad (3)$$

Impeller revolution speed: N [rps]

$$N = \frac{1}{\pi D}\sqrt{\frac{g \times H_{ad}}{\mu_{ad}}} \quad (4)$$

$$N = \frac{4 \times Q_{st}}{\pi^2 D^3 \phi} \quad (5)$$

In the expressions, $Q_{st}$ represents the compressor intake air flow [m³/s], $H_{ad}$ represents the compressor adiabatic head [m], D represents the outer diameter of the impeller [m], u represents the impeller circumferential speed [m/s], and g represents acceleration of gravity [m/s²].

Considering the apparatus characteristics of a centrifugal compressor, the revolution speed of the compressor can be derived from the expression (2) and controlled in proportion to the square root of the change in the adiabatic head in accordance with the difference between the outlet temperature of the cooling water and the outlet temperature of the cooled water (expression (4)), or can be derived from the expression (1) and controlled in proportion to the change in the compressor intake flow in accordance with the chilling capacity (expression (5)), whereby an inverter turbo chiller can be operated in such a way that at least one of the dimensionless parameters is controlled and maintained at an optimum design point.

However, the revolution speed N of the impeller of a turbo compressor is a variable internally controlled in a turbo chiller and hence cannot be directly controlled from the heat source system 1. To eliminate the inconvenience, it is appropriate to organize the above expressions by using as variables the chilling capacity and the cooling water temperature that are directly known and controllable from the heat source system 1. The following expression is obtained by deleting the impeller circumferential speed u from the expressions (1) and (2):

[Expression 2]

$$\left(\frac{H_{ad}}{\mu_{ad}}\right) = k\left(\frac{Q_{st}}{\phi}\right)^2 \quad (6)$$

$$k = \frac{16}{g \times \pi^2 \times D^4} \quad (7)$$

As seen from the expression (6), assuming that the flow coefficient φ, the pressure coefficient μad, and the coefficient k are fixed values, the relationship (arithmetic expression) between the air flow Qst and the head Had can be provided. In the expression (6), air flow Qst represents the flow of the refrigerant sucked into the compressor, and is hence a parameter proportional to the chilling capacity.

Therefore, the flow coefficient φ, the pressure coefficient μad, and the head Had at a specific chilling capacity (specific operating point), and the air flow Qst that corresponds to that chilling capacity are substituted into the expression (6) to determine the coefficient k' for that chilling capacity. The coefficient k' is then used to derive the following expression (8), the relationship between the air flow Qst and the head Had at the specific chilling capacity.

$$H_{ad} = k' \times Q_{st}^2 \quad (8)$$

Figure 4:
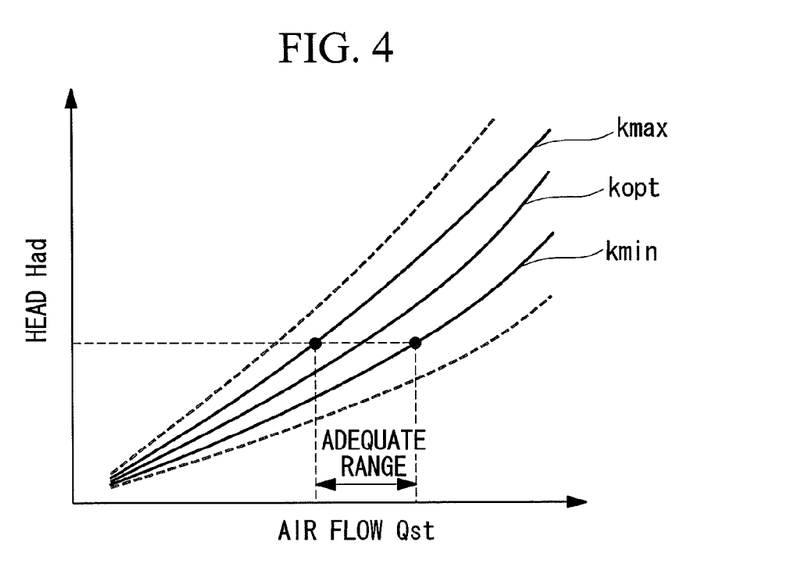
FIG. 4 shows graphs illustrating an adequate air flow range (adequate chilling capacity range) for a predetermined head.

The coefficient k' that corresponds to each chilling capacity is thus determined, and the resultant k' is used to draw the map shown in FIG. 4. Among the chilling capacities, test data obtained from an actual apparatus are referred to select the chilling capacity that leads to the highest COP, and the corresponding coefficient k' is called an optimum coefficient kopt. The smallest coefficient kmin and the greatest coefficient kmax that define an adequate operation coefficient range are determined in such a way that the optimum coefficient kopt is in between the smallest coefficient kmin and the greatest coefficient kmax, or preferably, the optimum coefficient is the center of the range.

During the actual operation, the head H at the time of operation is used to determine the air flow Qst within the optimum operation coefficient range, and the operation of the turbo chiller is controlled within the air flow range.

A description will be made of a verification test for verifying whether the control based on the above arithmetic expressions is reasonable.

Figure 5:
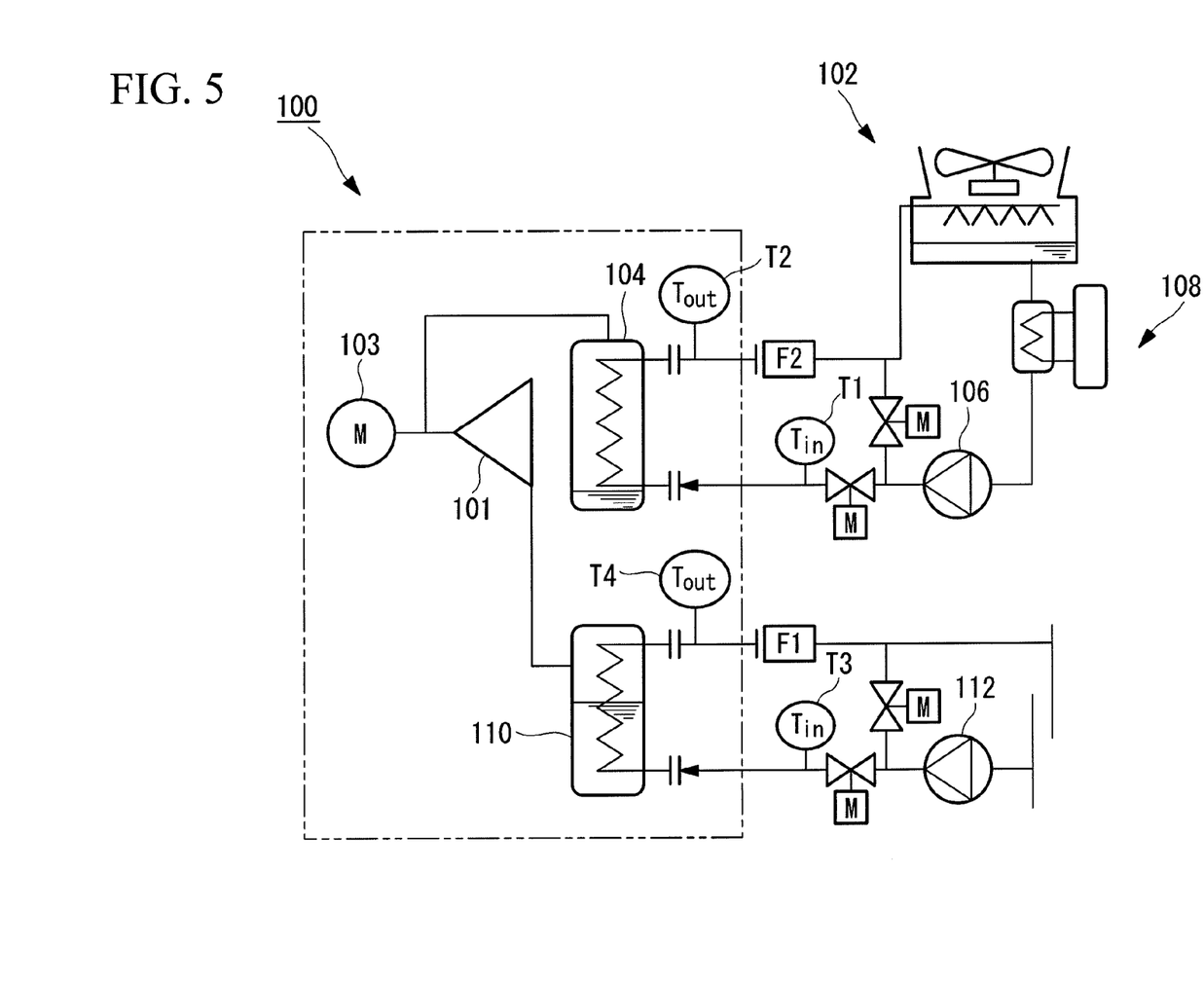
FIG. 5 is a schematic view showing a turbo chiller and cooling water facilities used in a verification test.

FIG. 5 shows a turbo chiller 100 and a cooling tower 102 used in the verification test. In FIG. 5, although the sub-cooler and the intermediate cooling device are omitted, the turbo chiller 100 is configured to achieve a two-stage compression and two-stage expansion sub-cooling cycle, as in the embodiment described above.

The chilling capacity of the turbo chiller 100 is set to 400 Rt. A turbo compressor 101 is driven by an inverter-driven electric motor 103 in a manner that enables variable revolution speeds.

Cooling water introduced from the cooling tower 102 through a cooling water pump 106 is supplied to a condenser 104. The cooling water that has been used for cooling is returned to the cooling tower 102, and cooled when sprayed from a spraying portion. To stabilize the temperature of the cooling water in a low-temperature range or in a low-calorie range, a turbo chiller 108 having a chilling capacity of 600 Rt is connected to the cooling water system. In this way, the inlet temperature of the cooling water is kept at 10° C. even in the summer months. The inlet temperature of the cooling water is measured with a temperature sensor T1, and the outlet temperature of the cooling water is measured with a temperature sensor T2. The flow of the cooling water is measured with a flow meter F2.

Cooled water from a cooled water pump 112 is supplied to an evaporator 110, and the cooled water cooled in the evaporator 110 is supplied to an external load (not shown). The inlet temperature of the cooled water is measured with a temperature sensor T3, and the outlet temperature of the cooled water is measured with a temperature sensor T4. The flow of the cooled water is measured with a flow meter F1.

The table below shows test results obtained by using the turbo chiller 100 described above. In the table, COP values computed from the resultant measurements are organized as functions of the chilling capacity and the inlet temperature of the cooling water. The table does not include data for the following three cases because stable measured data have not been obtained: the chilling capacities of 80%, 70%, and 60% for the cooling water inlet temperature of 12° C.

TABLE 1

| | Chilling capacity | | | | | |
|---|---|---|---|---|---|---|
| Temperature of cooling water | 100% 1407 kW | 80% 1125 kW | 70% 984.6 kW | 60% 843.9 kW | 40% 562.6 kW | 20% 281.3 kW |
| 32° C. | 5.69 | 5.89 | 5.79 | 5.46 | 4.19 | 2.65 |
| 29° C. | 6.32 | 6.56 | 6.58 | 6.29 | 4.81 | 2.91 |
| 25° C. | 7.36 | 7.75 | 7.75 | 7.78 | 6.53 | 4.19 |
| 20° C. | 9.11 | 9.87 | 10.09 | 10.22 | 9.56 | 6.18 |
| 15° C. | 11.02 | 13.00 | 13.66 | 14.19 | 14.22 | 10.01 |
| 13° C. | 12.25 | 14.56 | 15.70 | 16.54 | 17.24 | 11.42 |
| 12° C. | 12.48 | — | — | — | 18.85 | 15.92 |

Figure 6:
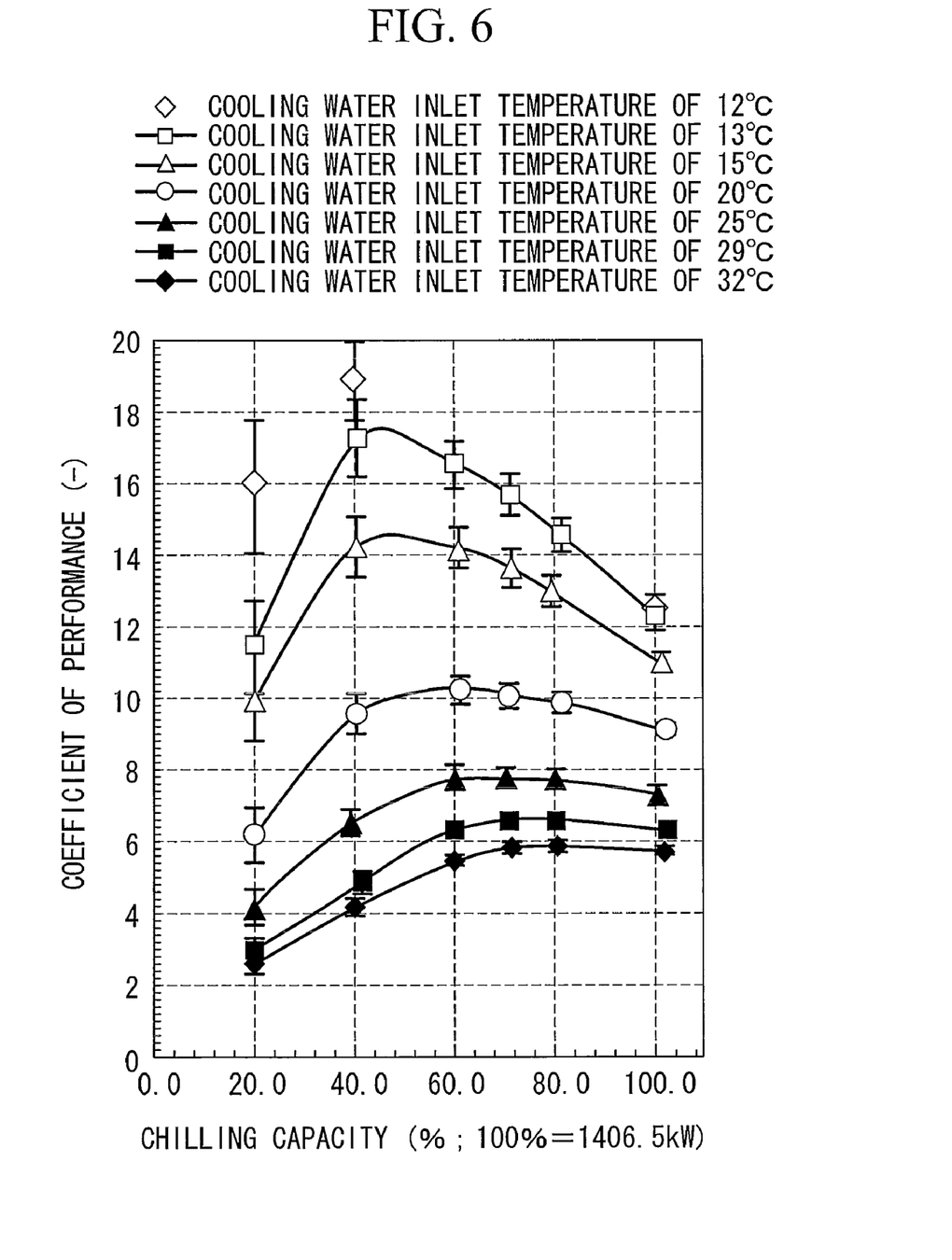
FIG. 6 shows verification test results in the form of graphs obtained by plotting COP versus chilling capacity for each cooling water inlet temperature.

FIG. 6 shows graphs obtained by plotting the data shown in the above table. In FIG. 6, the horizontal axis represents the chilling capacity in percentage terms, and the vertical axis represents the COP. The chilling capacity of 100% corresponds to 1406.5 kW. Each point of the graphs is sandwiched with error bars that correspond to the width of uncertainty about the measurement due to a sensor or other factors.

In FIG. 6, comparing the graphs for the respective fixed cooling water inlet temperatures reveals that COP peaks are present in the range of chilling capacities from 80% to 40%. For example, for the line for the cooling water temperature of 32° C., the peak occurs at about 80%. For the line for the cooling water temperature of 20° C., the peak occurs at about 60%. For the line for the cooling water temperature of 13° C., the peak occurs at about 40%. The temperature of the cooled water, the temperature of the cooling water, the flow of the cooled water, and the flow of the cooling water are continuous and hence consistent with those at the preceding and following load measurement points, and the heat balance is stable within a range smaller than or equal to predetermined uncertainty. The measured COP values can therefore be taken to represent characteristic performance properties of the inverter turbo chiller.

Figure 7:
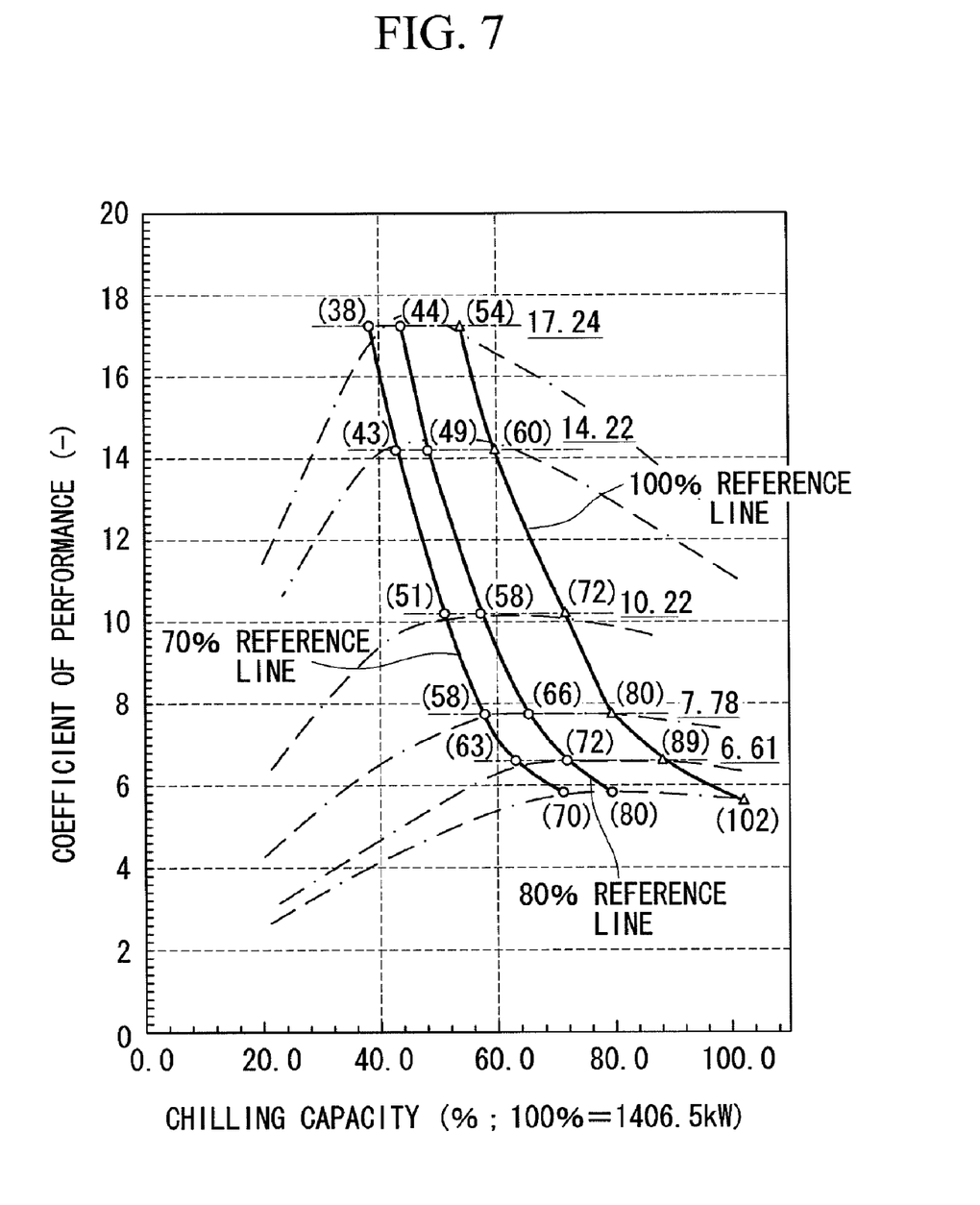
FIG. 7 shows graphs obtained by plotting COP values for respective coefficients versus chilling capacities.

The above results are used to evaluate the expression (8) as follows:

First, for example, assume that the point at the cooling water inlet temperature of 32° C. and the chilling capacity of 100% is an adequate operating point of the turbo compressor, and substitute the head Had and the air flow Qst at this operating point and the flow coefficient Φ and the pressure coefficient μad at this operating point into the expression (6) to determine the coefficient k100 (corresponding to k' in the expression (8)) at the chilling capacity of 100%. The coefficient k100 is then substituted into k' in the expression (8) to determine the air flow Qst using the head Had at the measurement point showing the highest COP at each of the cooling water inlet temperatures in Table 1. Further, a predetermined arithmetic expression is used to determine the chilling capacity that corresponds to the air flow Qst. For the chilling capacities of 80% and 70%, k80 and k70 are similarly determined, and the chilling capacity is determined using the head Had at the measurement point showing the highest COP at a single cooling water inlet temperature for each of k80 and k70. FIG. 7 shows graphs obtained by plotting the chilling capacities determined from k100, k80, and k70 at the cooling water inlet temperatures versus the respective highest COP values. FIG. 7 shows curves obtained by smoothly connecting the plotted points for k100, k80, and k70, and the curves are called a 100% reference line, an 80% reference line, and a 70% reference line, respectively. The computed chilling capacity is shown in the parentheses next to each plotted point. The highest COP at each of the cooling water inlet temperatures is imported from Table 1 and shown as an underlined value.

FIG. 7 also shows the curves obtained by plotting COP versus cooling water inlet temperature shown in FIG. 3.

FIG. 7 indicates that each of the reference lines follows the tendency of the COP curves for the cooling water inlet temperatures shown in FIG. 3. Specifically, the 80% reference line substantially coincides with the COP peak value at each of the cooling water inlet temperatures. The 100% and 80% reference lines pass through COP values smaller than those of the 80% reference line by predetermined values.

The COP property of the inverter turbo chiller thus strongly reflects the properties of the turbo compressor, which is a centrifugal compressor. Therefore, the arithmetic expression using the coefficient k' (see the expression (8)) obtained with reference to the flow coefficient $\Phi$, the pressure coefficient $\mu ad$, the cooling water temperature (head), and the chilling capacity at a specific operating point (the design point, for example), which are fixed values, can be used to readily estimate a COP peak point and the vicinity thereof.

As described above, the heat source system of the present embodiment can provide the following advantageous effects:

The flow coefficient $\Phi$ and the pressure coefficient $\mu ad$ at a specific operating point and a predetermined coefficient k of the turbo compressor 60 are used to provide the arithmetic expressions (expressions (6) to (8)) representing the relationship between the chilling capacity and the head. The chilling capacity that can lead to a substantially highest COP at a single head (the temperature of the cooling water in the present embodiment) is used to determine an optimum coefficient kopt. A predetermined range including the optimum coefficient kopt is set to an adequate operation coefficient range, and a head at the time of operation that leads to the adequate operation coefficient range is substituted into the arithmetic expression, whereby an adequate chilling capacity range can be known. Since the adequate chilling capacity range can thus be obtained from the arithmetic expression by substituting an arbitrary head at the time of operation, any situation can be flexibly handled even when the operation conditions (for example, the cooling water temperature that affects the head) are changed. Therefore, since each of the turbo chillers can be operated within an adequate chilling capacity range for arbitrary operation conditions, the turbo chiller can be operated within a range where a good COP is obtained, whereby the amount of energy saving can be significantly higher than ever before.

In determining the number of turbo chillers 11, 12, and 13 to be activated to satisfy the chilling capacity required for the external load 3, the number control is carried out in such a way that each of the activated turbo chillers is operated within an adequate chilling capacity range obtained by the arithmetic expression, whereby a plurality of turbo chillers can be operated at high COP values to provide a high energy saving effect.

The invention claimed is:

1. A turbo chiller operated within a predetermined adequate chilling capacity range, the turbo chiller comprising:
   a turbo compressor driven by an inverter in a manner that enables variable revolution speeds;
   a condenser that condenses refrigerant compressed by the turbo compressor;
   an expansion valve that expands the condensed refrigerant; and
   an evaporator that evaporates the expanded refrigerant to cool cooled water,
   wherein the adequate chilling capacity range is obtained by using a flow coefficient and a pressure coefficient at a specific operating point of the turbo compressor as well as a predetermined coefficient to determine an arithmetic expression representing the relationship between a head and a chilling capacity, using a chilling capacity that can lead to a substantially highest coefficient of performance at a single head to obtain the predetermined coefficient as an optimum coefficient, computing an adequate operation coefficient range having a predetermined range and including the optimum coefficient, and substituting the adequate operation coefficient range and a head at the time of operation into the arithmetic expression.

2. A heat source system characterized in that
   the heat source system comprises a plurality of turbo chillers according to claim 1, and
   the number of the turbo chillers to be activated is controlled in such a way that the sum of chilling capacities outputted from the turbo chillers operated within the adequate chilling capacity range satisfies the chilling capacity required for an external load.

3. A method for controlling a heat source system characterized in that
   the heat source system comprises a plurality of turbo chillers according to claim 1, and
   the method includes controlling the number of the turbo chillers to be activated in such a way that the sum of chilling capacities outputted from the turbo chillers operated within the adequate chilling capacity range satisfies the chilling capacity required for an external load.

4. A method for controlling a turbo chiller operated within a predetermined adequate chilling capacity range, the turbo chiller including a turbo compressor driven by an inverter in a manner that enables variable revolution speeds, a condenser that condenses refrigerant compressed by the turbo compressor, an expansion valve that expands the condensed refrigerant, and an evaporator that evaporates the expanded refrigerant to cool cooled water, the method comprising:
   using a flow coefficient and a pressure coefficient at a specific operating point of the turbo compressor as well as a predetermined coefficient to determine an arithmetic expression representing the relationship between a head and a chilling capacity;
   using a chilling capacity that can lead to a substantially highest coefficient of performance at a single head to obtain the predetermined coefficient as an optimum coefficient;
   computing an adequate operation coefficient range having a predetermined range and including the optimum coefficient; and
   substituting the adequate operation coefficient range and a head at the time of operation into the arithmetic expression to obtain the adequate chilling capacity range.

* * * * *